United States Patent [19]
Alev

[11] Patent Number: 5,099,960
[45] Date of Patent: Mar. 31, 1992

[54] COMPOSITE BRAKE DISK AND METHOD OF EXTENDING THE BRAKING SERVICE LIFE THEREOF

[75] Inventor: Murat A. Alev, Clinton, Ohio

[73] Assignee: Aircraft Braking Systems Corp., Akron, Ohio

[21] Appl. No.: 564,474

[22] Filed: Jul. 27, 1990

[51] Int. Cl.⁵ ............................................. F16D 65/00
[52] U.S. Cl. ................... 188/73.1; 29/402.04; 29/402.06; 188/218 XL
[58] Field of Search ............ 188/218 XL, 73.1, 71.6, 188/71.7, 214; 192/107 R, 70.13; 29/401.01, 402.01, 402.03, 402.04, 402.06

[56] References Cited

U.S. PATENT DOCUMENTS

| | | | |
|---|---|---|---|
| 3,800,392 | 4/1974 | Cook et al. | 188/218 XL X |
| 4,457,967 | 7/1984 | Chareire et al. | 188/251 A X |
| 4,482,818 | 11/1984 | Pigford | 188/218 XL X |
| 4,742,948 | 5/1988 | Fisher et al. | 188/251 A X |

Primary Examiner—Robert J. Oberleitner
Assistant Examiner—Lee W. Young
Attorney, Agent, or Firm—L. A. Germain

[57] ABSTRACT

The invention provides an integral brake disk comprised of two brake disks each having a disk thickness of one-half the design required disk thickness and these two disks are clamped together in planar face-to-face orientation by fasteners to form the integral brake disk. The integral brake disk has an inboard-facing brake wear surface provided by a wear surface of a first of the combined brake disks and an outboard-facing brake wear surface provided by the second of the combined brake disks. The integral brake disk is put into braking service for a first period after which refurbishment is required. The integral brake disk is refurbished by declamping the two disks and grinding the worn wear surfaces to planar specification. The two disks are recombined at the ground planar surfaces and reclamped to form a new integral brake disk. The new integral brake disk has an inboard-facing brake wear surface provided by the second of the two disks and an outboard-facing brake wear surface provided by the first of the recombined disks. The integral brake disk may now be used for an additional period of braking service.

12 Claims, 2 Drawing Sheets

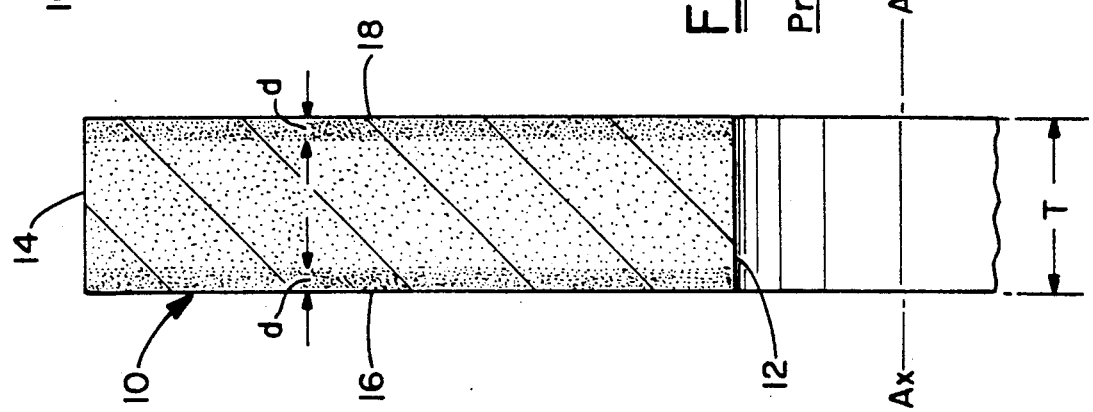
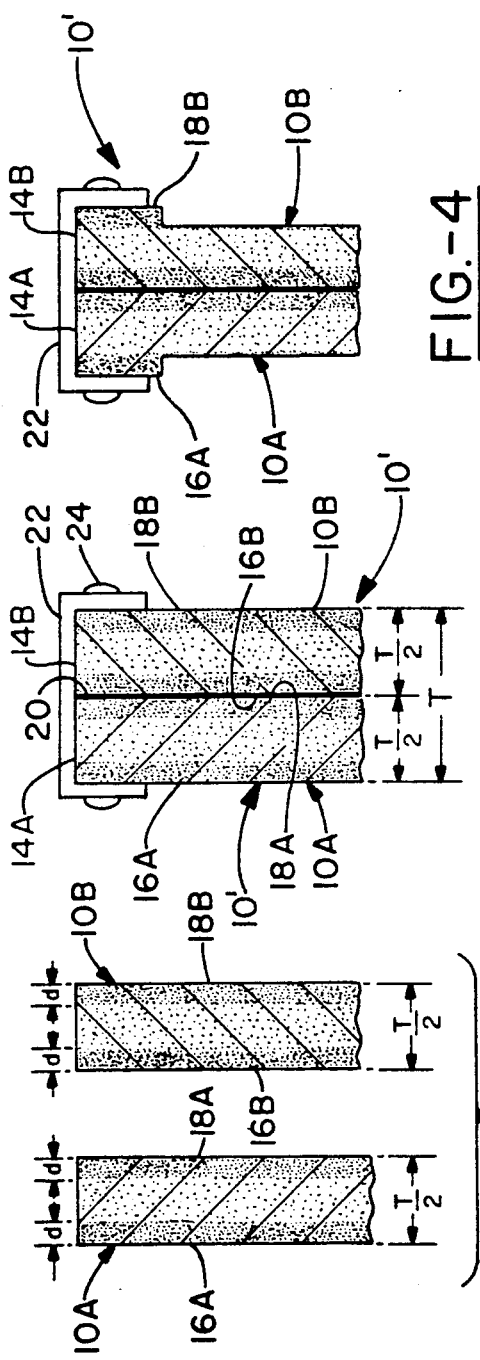
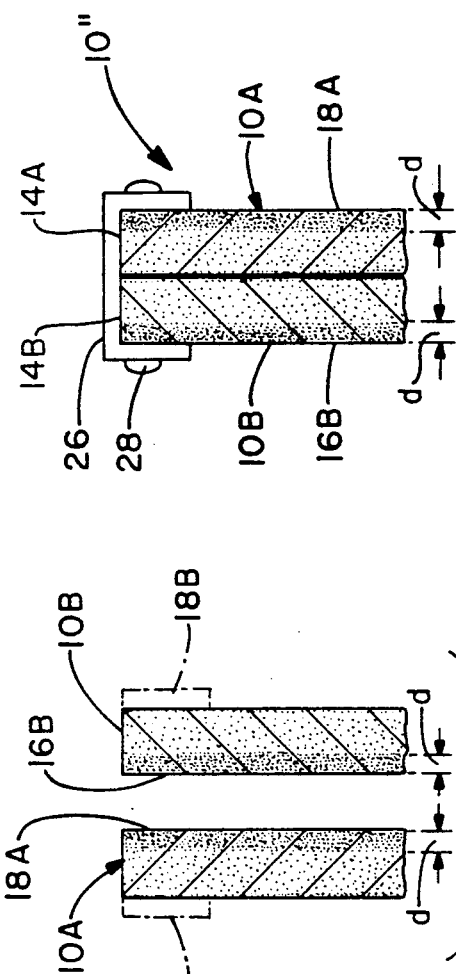

COMPOSITE BRAKE DISK AND METHOD OF EXTENDING THE BRAKING SERVICE LIFE THEREOF

BACKGROUND OF THE INVENTION

This invention pertains generally to aircraft brakes and, more particularly, to a composite brake disk as may be applied to aircraft multi-disk brake assemblies. The brake disk of this invention is configured to facilitate a refurbishment of the disk after a first period of braking service such that it exhibits original braking surface properties without resort to extensive surface grinding and refinishing of the braking wear surfaces prior to being returned to braking service.

Presently, airline companies maintain extensive inventories of aircraft parts including brake disks and/or disk brake assemblies. These inventories are necessary to keep aircraft flying and to eliminate costly downtime. Irrespective of the inventory of brake parts, there are a certain number of brake disks and brake assemblies in transit to and from the brake manufacturer where they are refurbished for continued use. These parts are termed "the float" because, while they are owned by the airline, they are not readily available for use. Obviously, the available inventory and "the float" represent a sizable investment of aircraft parts to the airline company.

Accordingly, it would be a great benefit to the industry if the inventory and/or the "float" could be reduced or possibly even be eliminated altogether. The present invention suggests a partial solution to this problem by providing a brake disk configuration which will eliminate returning of worn brake disks to the brake manufacturer for refurbishment but will facilitate refurbishing of such brake disks at an airline's own facility and/or at local brake service centers. These brake disks may then be returned to braking service for an additional period of time. The refurbishment could be accomplished by airline personnel and this would obviously eliminate some of the costs which are associated with the administration, packaging, and transportation of these type brake parts to the original brake manufacturer.

Therefore, it is in accordance with one aspect of the present invention an object to provide a brake disk configuration which would facilitate an interim brake disk refurbishment such that the disk may be put back into braking service for an additional period of time.

In accordance with another aspect of the invention it is an object to provide a composite brake disk which exhibits four composite densified brake wear surfaces, a first pair of wear surfaces usable for a first period of braking service and a second pair of wear surfaces usable for a second period of braking service.

According to still another aspect of the present invention it is an object to provide a composite brake disk comprised of two identical disks each of which has a disk thickness of one-half the design required disk thickness and composite densified brake wear surfaces on both planes, the two disks combined into a single integral brake disk by fastening means which clamp the two disks together.

In accordance with still another aspect of the invention it is object to provide a carbon composite brake disk comprised of two conventionally manufactured brake disks and each disk exhibits carbon densified brake wear surfaces and a disk thickness of one-half the design required disk thickness and the two disks are combined such that the resultant integral brake disk exhibits four useful carbon densified brake wear surfaces, a first pair usable for a first period of braking service and a second pair usable for a second period of braking service.

In accordance with another aspect of the invention it is an object to teach a method of providing a composite brake disk which is usable for a first period of braking service whereupon it may be refurbished by simple and well-known techniques and thereafter put back into service for an additional period of braking service life.

SUMMARY OF THE INVENTION

These and various other aspects and advantages of the present invention are accomplished in a brake disk comprised of in combination: a first composite brake disk having inboard-facing and outboard-facing brake wear surfaces; a second composite brake disk having inboard-facing and outboard-facing brake wear surfaces; and fastening means to clamp the first and second disks together in planar face-to-face orientation to form an integral brake disk; said integral brake disk exhibiting an inboard-facing brake wear surface comprised of the first disk and an outboard-facing brake wear surface comprised of the second disk and the outboard and inboard wear surfaces of the first and second disks respectively forming a non-bonded interface between the two disks within the integral brake disk.

The various aspects and advantages of the invention are also accomplished in a method of providing a brake disk which is useful for two periods of braking service without resorting to conventional brake disk refurbishing proceedures, the method comprising the steps of: making composite brake disks according to conventional practices but to a disk thickness of one-half of the design required thickness; clamping two of the disks together in planar face-to-face orientation to form an integral brake disk, the integral brake disk exhibiting an inboard-facing brake wear surface comprised of a wear surface of a first of the two brake disks and an outboard-facing brake wear surface comprised of a wear surface of the second of the two disks; subjecting the integral brake disk to a first period of braking service; refurbishing the integral brake disk by declamping the two disks and refinishing the worn brake wear surfaces; recombining the two disks in planar face-to-face orientation at their refinished brake wear surfaces to form a new integral brake disk which exhibits an inboard-facing brake wear surface comprised of the second of the two brake disks and an outboard-facing brake wear surface comprised of the first of the two brake disks; and subjecting the new integral brake disk to a new period of braking service.

BRIEF DESCRIPTION OF THE DRAWINGS

The invention will be better appreciated and understood from a consideration of the following detailed description when taken in conjunction with the accompanying drawings, in the several figures in which like reference numerals indicate like parts, elements, or members and the primed and double-primed numerals indicate like elements or members of the unprimed numerals, and in which:

FIG. 1 is a partial elevational view, in cross-section, of a composite brake disk as may be applied to aircraft multi-disk brake assemblies, the disk having an axis of rotation about the indicated Ax—Ax axis;

FIG. 2 is a partial elevational view, in cross-section, of two composite brake disks which are similar to the disk shown in FIG. 1 but made in accordance with this invention;

FIG. 3 is a partial elevational view, in cross-section, of the two brake disks shown in FIG. 2 as these may be combined into a single integral brake disk;

FIG. 4 is a partial elevational view, in cross-section, of the integral brake disk shown in FIG. 3 as such disk is worn to a limit and in need of refurbishment;

FIG. 5 illustrates partial elevational views, in cross-section, of the brake disks of FIGS. 2-4 as these may be refurbished for additional braking service;

FIG. 6 is a partial elevational view, in cross-section, of the two refurbished brake disks shown in FIG. 5 as these are combined to form a new integral brake disk which may be used for an additional period of braking service.

DETAILED DESCRIPTION OF THE INVENTION

Figure 7:
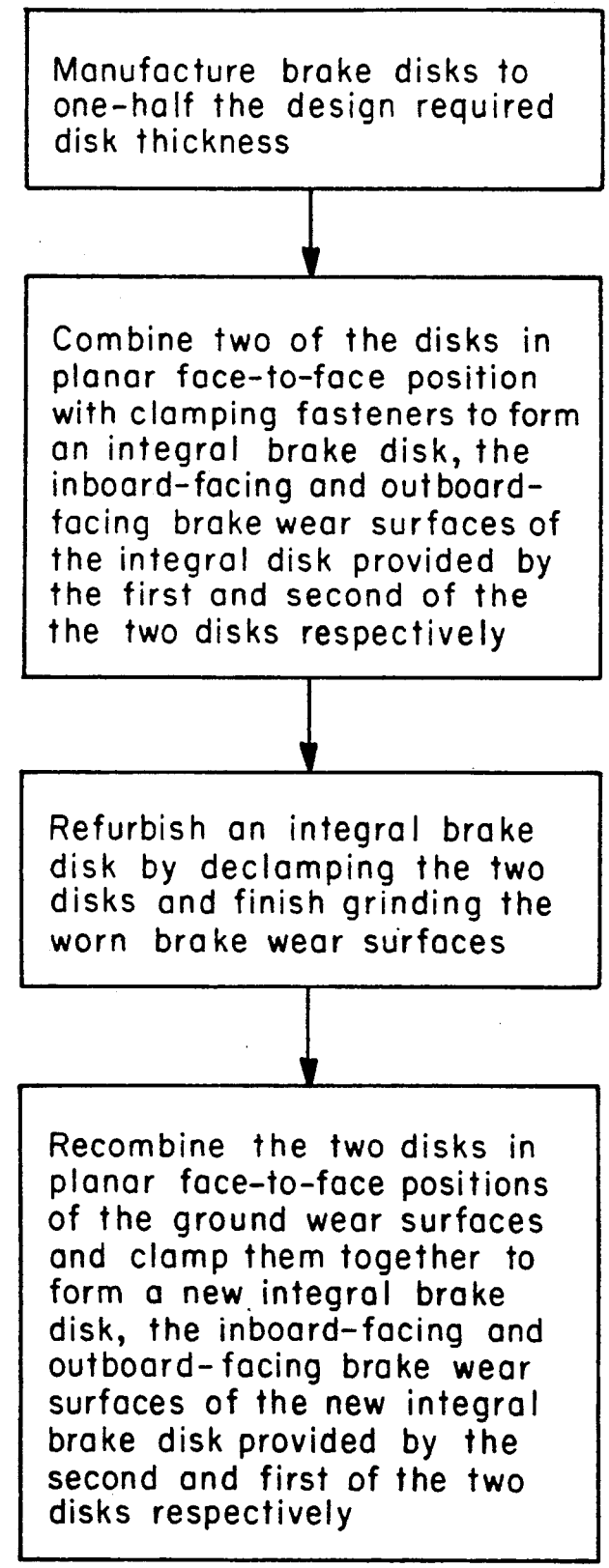
FIG. 7 is a flow diagram illustrating the method of the invention which facilitates an interim brake disk refurbishment to achieve two periods of braking service of a brake disk which will exhibit original braking wear surface properties for both periods of service.

Referring firstly to FIG. 1 of the drawings, a brake disk of conventional manufacture is illustrated in a partial elevational view and in cross-section, the axis of rotation of the disk being about an axis indicated at Ax—Ax. The brake disk, generally indicated by reference numeral 10, is characterized by an axial bore 12 such that it may be mounted about a brake torque tube (not shown) and wheel axle (not shown) of an aircraft landing gear assembly. The brake disk 10 may be mounted for rotation with a wheel, or alternatively, it may be mounted in a fixed position to the torque tube and relatively stationary with respect to the wheel. The type of mounting, whether rotatable or stationary, will depend upon the drive key connections as these may be made about an outer peripheral edge 14 for rotation with a wheel, or alternatively, within the axial bore 12 for stationary connection to the brake torque tube. The particular drive key connections are well known to persons working and knowledgeable in this art and the specifics thereof are not important to this invention suffice to say that the brake disk 10 may be mounted within a multi-disk brake stack as a stationary disk or, alternatively, as a rotatable disk.

The brake disk 10 generally comprises a composite material of known manufacture and it is characterized by planar brake wear surfaces indicated in the drawing at numerals 16 and 18. Further, in the mounting of a brake disk within a multi-disk stack of a brake assembly, there is conventionally an inboard end and an outboard end of the brake assembly and this is taken with respect to the aircraft landing gear. For the purposes of this description, the planar wear surface 16 will be designated the inboard-facing brake wear surface of the disk while the planar wear surface 18 will be designated the outboard-facing brake wear surface of the disk. The brake wear surfaces 16 and 18 may be composite densified by various known processes to increase the density of the composite to a depth indicated at "d" in the drawing. The depth "d" of densification is a known parameter of the process and it is a limiting factor in the service life of the brake wear surfaces 16 and 18 of the disk 10. For example, when the disk wear surfaces 16,18 are worn into the composite to the depth "d", then the disk must be refurbished or replaced. Presently, after a first wear period, the disk 10 is refurbished by finish grinding of the planar surfaces 16,18 and then re-densifying the surfaces to an additional depth "d" within the composite. Obviously, the disk 10 will be thinner than the original but it may still be used for an additional period of braking service. In any event, the brake disk 10 is returned to the original manufacturer for the interim refurbishment because the manufactuer has the personnel and equipment to accomplish the disk refurbishment.

The brake disk 10 is further characterized by a thickness indicated in the drawing at "T" which, for the purposes of this description, will be considered the design required thickness of a particular manufacturer's brake disks. The disk thickness "T" may vary from one manufacturer to another and, therefore, the actual thickness specification is not important to this invention suffice to say that a brake disk may be characterized by a design required thickness "T" whatever it may be for a particular brake.

Referring now to FIG. 2 of the drawings, a pair of composite brake disks are illustrated and generally indicated by reference numerals 10A and 10B respectively. The drawing is a partial elevational view, in cross-section, of each disk and the showing is similar to FIG. 1 in that the disks 10A,10B are characterized by axial bores 12 (not shown) and axes of rotation about an axis Ax. The brake disks 10A,10B are manufactured in the conventional manner of aircraft brake disks but, differ in that the disks 10A,10B are characterized by a disk thickness "T/2" which is one-half the design required thickness "T" of a particular disk 10. The brake disks 10A and 10B also have planar brake wear surfaces 16A and 16B respectively which are the inboard-facing wear surfaces of the disks and planar brake wear surfaces 18A and 18B respectively which are the outboard-facing brake wear surfaces of the disks. The planar surfaces 16A,16B and 18A,18B have been composite densified to a depth "d" in the same manner of brake disk 10 of FIG. 1. Thus, the brake disks 10A and 10B are manufactured to the same brake disk specifications as the disk 10 except that each brake disk 10A,10B is approximately one-half the design required thickness "T" of the brake disk 10.

Further with respect to the brake disks 10A and 10B, it should be understood that these disks may comprise any of the known or, yet to be known, composite materials which are suitable for braking applications. Accordingly, and while at the present time carbon composite materials are the composite of choice, this invention is not limited in any way to the particular composite material which forms the brake disks.

Continuing with reference to FIG. 3 of the drawings, the brake disks 10A and 10B are illustrated as these may be combined into a single integral brake disk which is generally indicated by reference numeral 10'. The brake disk 10' comprises the two disks 10A and 10B in planar face-to-face orientation and therefor has a thickness "T" so as to be a replacement disk for the brake disk 10 of FIG. 1. The two disks 10A,10B are clamped together by fastening means 22 which may include rivets 24 in the conventional manner of such fastening-means. While the fastening means 22 is shown in the drawing in mounted position at the outer peripheral edges 14A and 14B of the brake disks 10A and 10B respectively, it will be recognized that such fastening means may be mounted within the axial bores of the disks. In any event, the brake disks 10A and 10B are combined into a single integral disk 10 and the inboard-facing brake wear surface of the disk 10' comprises the inboard planar wear surface 16A of the disk 10A while the outboard-facing brake wear surface of the disk 10' comprises the outboard planar wear surface 18B of the brake disk 10B. In this configuration, the planar wear surfaces 18A and 16B of the disks 10A and 10B respectively comprise a non-bonded interface between the two disks 10A and 10B and within the integral brake disk 10'.

Referring now to FIG. 4 of the drawings, the figure illustrates the brake disk 10' after it has been through a first period of braking service and exhibits worn braking wear surfaces 16A and 18B. As illustrated in the drawing, the wear surfaces 16A and 18B are worn to the approximate extent of composite densification depth "d" and therefore the disk 10' requires refurbishment. In this respect, it will be appreciated that the brake disk 10' will have had a first period of braking service which is equal to the brake disk 10 because both disks 10 and 10' exhibit braking wear surfaces which have been composite densified to the same depth "d".

In contrast to the brake disk 10 which must be returned to the original brake manufacturer for refurbishment and this will require finish grinding and re-densification of the braking wear surfaces 16A and 18B, the brake disk 10' may be refurbished without any further re-densification of its braking wear surfaces. The refurbishment may be accomplished by declamping the fastening means 22 and finish grinding of the worn braking wear surfaces 16A and 18B as illustrated in FIG. 5 of the drawings.

The two disks 10A and 10B are then interchanged in their positions such that the ground planar surfaces 16A and 18B are oriented in planar face-to-face relationship to comprise a non-bonded interface within a new integrally formed brake disk which is generally indicated in FIG. 6 by reference numeral 10''. Of course, this new integral brake disk 10'' is thinner than the disks 10 and 10' by the amount of wear and finish grinding done to the surfaces 16A and 18B. Because the new integral brake disk 10'' is thinner, new fastening means 26 and 28 are required to clamp the two disks 10A,10B together in their new orientations. The new integral brake disk 10'' is characterized by an inboard-facing brake wear surface 16B comprised of the brake disk 10B and an outboard-facing brake wear surface 18A comprised of the brake disk 10A. Obviously, the brake wear surfaces 16B and 18A have been composite densified in the manufacure of each of the disks 10A and 10B and to a densification depth "d" and, therefore, the brake disk 10'' is ready for an additional period of braking service.

FIG. 7 of the drawings illustrates the method and/or process of the invention in accomplishing an interim brake disk refurbishment which does not require that a brake disk be returned to the original manufacturer for refurbishment service. The method comprises the steps of (a) manufacturing a plurality of brake disks according to conventional practices but to a disk thickness which is one-half the design required thickness; (b) combining two of the disk in planar face-to-face position with clamping means to form an integral brake disk wherein the inboard-facing and outboard-facing brake wear surfaces comprise wear surfaces of a first and second of the two disk respectively; (c) refurbishing the integral brake disk by declamping the two disks and finish grinding of the worn brake wear surfaces; and (d) recombining the two disks in planar face-to-face positions of the ground wear surfaces and clamping the disks together to form a new integral brake disk; the new integral brake disk having inboard-facing and outboard-facing brake wear surfaces which comprise the second and first of the two disks respectively. The new integral brake disk may, of course, be returned to braking service.

It was mentioned earlier that the composite material which comprises the brake disks may be any known composite suitable for braking applications and that the present choice happens to be various carbon composites. In this respect, a carbon composite brake disk may have carbon densified brake wear surfaces 16 and 18 which have been densified by various known methods and/or processes. These processes include ones which carry the following names: (i) carbon vapor densification, (ii) resin impregnating densification, and (iii) pitch impregnating densification. This invention, therefore, is not limited by the manner or process in which the braking wear surfaces of a carbon composite brake disk is carbon densified.

From the foregoing description, it must be appreciated that the various aspects and advantages of the present invention are met and, while certain representations and details have been shown for the purpose of illustrating the invention, it will be apparent to those skilled in this art, that various changes and/or modifications may be made therein without departing from the spirit or scope of the invention.

What is claimed is:

1. A brake disk comprising in combination:
   a first composite brake disk having inboard-facing and outboard-facing brake wear surfaces;
   a second substantially identical composite brake disk having inboard-facing and outboard-facing brake wear surfaces; and
   fastening means which function to clamp the first and second disks together in planar face-to-face orientation to form an integral brake disk;
   said integral brake disk exhibiting an inboard-facing brake wear surface comprised of the inboard-facing wear surface of the first disk and an outboard-facing brake wear surface comprised of the outboard-facing wear surface of the second disk, said outboard-facing and inboard-facing wear surfaces of the first and second disks respectively, forming a non-bonded interface between the two disks within the integral brake disk;
   said integral brake disk being refurbishable by exchanging the positions of the first and second disks which are clamped together by fastening means to form a new integral brake disk; said new integral brake disk exhibiting an inboard-facing brake wear surface comprised of the inboard-facing wear surface of the second disk and an outboard-facing brake wear surface comprised of the outboard-facing wear surface of the first disk.

2. A brake disk as set forth in claim 1 wherein the inboard-facing and outboard-facing brake wear surfaces of the first and second disks are composite densified to a specific depth within the composite material forming the disks.

3. A brake disk as set forth in claim 2 wherein the first and second composite brake disks are comprised of a carbon composite material.

4. A brake disk as set forth in claim 3 wherein the inboard-facing and outboard-facing brake wear surfaces of the first and second disks are carbon densified.

5. A brake disk for mounting within a brake disk stack of an aircraft multi-disk brake assembly, said brake disk comprising in combination;
   a first composite brake disk having inboard-facing and outboard-facing brake wear surfaces;
   a second composite brake disk having inboard-facing and outboard-facing brake wear surfaces; and
   fastening means to clamp the first and second disks together in planar face-to-face orientation to form an integral brake disk;
   said integral brake disk exhibiting four braking wear surfaces, an inboard-facing and an outboard facing brake wear surface comprised of the first and second disks respectively for use during a first period of braking service and, an inboard-facing and an outboard-facing brake wear surface comprised of the second and first disks respectively for use during a second period of braking service.

6. A brake disk as set forth in claim 5 wherein the inboard-facing and outboard-facing brake wear surfaces of the first and second disks are composite densified to a specific depth within the composite material forming the disks.

7. A brake disk as set forth in claim 6 wherein the first and second disks are comprised of a carbon composite material.

8. A brake disk as set forth in claim 7 wherein the inboard-facing and outboard-facing brake wear surfaces of the first and second disks are carbon densified.

9. A method of making and using a brake disk for two periods of braking service comprising the steps of:
   making a plurality of composite brake disks to a disk thickness of T/2 wherein T is the design required thickness;
   combining a first and a second of the disks together in planar face-to-face orientation with clamping means to form an integral brake disk, said integral brake disk exhibiting an inboard-facing brake wear surface comprised of a wear surface of the first disk and an outboard-facing brake wear surface comprised of a wear surface of the second disk;
   refurbishing the integral brake disk after a first period of braking service by declamping the first and second disks and grinding their worn brake wear surfaces to present planar surfaces;
   recombining the first and second disks in repositioned planar face-to-face orientation and clamping the disks together with fastening means to form a new integral brake disk, said new integral brake disk exhibiting an inboard-facing brake wear surface comprised of a wear surface of the second disk and an outboard-facing brake wear surface comprised of a wear surface of the first disk; and
   returning the new integral brake disk to a second period of braking service.

10. A method as set forth in claim 9 wherein the brake wear surfaces of the plurality of brake disks are composite densified such that the integral brake disk presents four densified brake wear surfaces, an inboard-facing and an outboard-facing densified brake wear surface comprised of the first and second disks respectively for a first period of braking service and, an inboard-facing and an outboard-facing densified braking wear surface comprised of the second and first disks respectively for a second period of braking service.

11. A method as set forth in claim 10 wherein the plurality of brake disks are comprises of a carbon composite material and the method includes the step of carbon densifying the brake wear surfaces of the disks.

12. A method of providing carbon composite brake disks applicable to a brake disk stack as used in aircraft multi-disk brake assemblies such that a brake disk of the stack may be used for a first period of braking service and then refurbished and used for a second period of braking service without resorting to additional densification of the disk brake wear surfaces, the method comprising the steps of:
   manufacturing a plurality of carbon composite brake disks to a disk thickness of T/2 wherein T is the design required thickness;
   carbon densifying the brake wear surfaces of the disks to a depth "d" within the composition forming the disks;
   combining two disks of the plurality of disks in planar face-to-face orientation by clamping the disks together with fastening means to form an integral brake disk, a first of the disks providing an inboard-facing brake wear surface and a second of the disks providing an outboard-facing brake wear surface of the integral brake disk;
   subjecting the integral brake disk to a first period of braking service;
   refurbishing a worn integral brake disk after the first period of braking service by declamping the first and second disks which comprise the integral brake disk and grinding the worn brake wear surfaces to planar specifications;
   recombining the first and second disks by repositioning them in planar face-to-face orientation and clamping them together to form a new integral brake disk, the second of the disks providing an inboard-facing brake wear surface and the first of the disks providing an outboard-facing brake wear surface of the new integral brake disk; and
   returning the new integral brake disk to the brake disk stack for a new period of braking service.

* * * * *